US009581706B2

(12) United States Patent
Huang

(10) Patent No.: US 9,581,706 B2
(45) Date of Patent: Feb. 28, 2017

(54) GEOPHONE WITH TUNABLE RESONANCE FREQUENCY

(71) Applicant: HALLIBURTON ENERGY SERVICES, INC., Houston, TX (US)

(72) Inventor: Wei Hsuan Huang, Singapore (SG)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 14/910,234

(22) PCT Filed: Dec. 31, 2013

(86) PCT No.: PCT/US2013/078401
§ 371 (c)(1),
(2) Date: Feb. 4, 2016

(87) PCT Pub. No.: WO2015/102595
PCT Pub. Date: Jul. 9, 2015

(65) Prior Publication Data
US 2016/0170051 A1 Jun. 16, 2016

(51) Int. Cl.
G01V 1/00 (2006.01)
G01V 1/18 (2006.01)
G01V 1/42 (2006.01)

(52) U.S. Cl.
CPC .............. G01V 1/184 (2013.01); G01V 1/183 (2013.01); G01V 1/42 (2013.01); G01V 2210/1429 (2013.01)

(58) Field of Classification Search
CPC ...... G01V 1/182–1/188; G10K 11/006; G10K 11/002
See application file for complete search history.

(56) References Cited

U.S. PATENT DOCUMENTS 4,144,520 A 3/1979 McNeel
4,159,464 A 6/1979 Hall, Jr. et al.
(Continued)

FOREIGN PATENT DOCUMENTS

WO 2015/102595 7/2015

OTHER PUBLICATIONS

PCT International Search Report and Written Opinion, dated Sep. 24, 2014, Appl No. PCT/US2013/078401, "Geophone with Tunable Resonance Frequency," Filed Dec. 31, 2013, 10 pgs.
(Continued)

Primary Examiner — Luke Ratcliffe
Assistant Examiner — Hovhannes Baghdasaryan
(74) Attorney, Agent, or Firm — Iselin Law PLLC; Alan Bryson

(57) ABSTRACT

An illustrative geophone with tunable resonance frequency includes a first inductive assembly including an inductive coil having a first magnet arranged therein, wherein the first magnet and the first inductive coil move relative to each other, and a second inductive assembly including a second inductive coil having a second magnet arranged therein, wherein the second magnet and the second inductive coil move relative to each other. A coupling element couples a movable element of the first inductive assembly with a moveable element of the second inductive assembly. The first inductive assembly employs tunable damping to modify a resonant frequency of the second inductive assembly.

19 Claims, 3 Drawing Sheets

(56) References Cited

U.S. PATENT DOCUMENTS

| | | | |
|---|---|---|---|
| 4,504,932 A | | 3/1985 | Sundt |
| 5,119,345 A | | 6/1992 | Woo et al. |
| 5,172,345 A | * | 12/1992 | van der Poel ......... G01H 11/02 |
| | | | 181/122 |
| 5,335,208 A | | 8/1994 | Sansone |
| 5,503,225 A | | 4/1996 | Withers |
| 2009/0238043 A1 | * | 9/2009 | Kamata .................. G01V 1/40 |
| | | | 367/182 |
| 2011/0007608 A1 | | 1/2011 | Woo |
| 2011/0007609 A1 | | 1/2011 | Woo |
| 2015/0035544 A1 | * | 2/2015 | Onaran .................. G01V 1/18 |
| | | | 324/602 |

OTHER PUBLICATIONS

Bakhoum, Ezzat G., et al., "Frequency-Selective Seismic Sensor," IEEE Transactions on Instrumentation and Measurement, vol. 61 No. 3, Mar. 2012, p. 823-829.

Edwards, P., "Mass-Spring-Damper Systems: The Theory," Mass-Spring-Damper Systems: The Theory, 2001, 9 pgs., Bournemouth University, United Kingdom.

Kan, T.K., et al., "Attenuation Measured from VSP: Evidence of Frequency-Dependent Q," Arco Oil & Gas; SEG Technical Program Expanded Abstracts 1983: pp. 589-590.

AU Patent Examination Report, dated Oct. 27, 2016, Appl No. 2013409442, "Geophone with Tunable Resonance Frequency," Filed Dec. 31, 2013, 3 pgs.

* cited by examiner

GEOPHONE WITH TUNABLE RESONANCE FREQUENCY

BACKGROUND

A geophone is a sensor that is often employed for seismic survey operations, typically as part of an extensive array of such sensors. Geophones normally take the form of a mass-spring system, in which a spring-mounted mass is movable with respect to a housing. The mass may be magnetic in nature or the geophone may be equipped with a magnet that provides a magnetic field, which facilitates monitoring of the mass's relative motion by an inductive coil attached to the housing. As seismic waves encounter the geophone, they displace the mass relative to the housing. So long as the displacement frequency is within the geophone's response range, this displacement causes the spring-mounted mass to move relative to the housing. (An example of a typical geophone response range would be 3-40 Hz. Other illustrative ranges include 20-200 Hz, and 3-13 kHz.) The motion of the magnetic mass relative to the inductive coil generates a voltage at the coil's terminals proportional to the relative velocity of the mass. The resonance frequency or frequencies of the mass-spring system may be chosen to improve the transducer's response to a selected frequency, but such frequencies are often a fixed parameter of the geophone design. Frequencies outside the transducer's range are substantially attenuated.

One approach that may be employed to address this issue in a controlled survey environment is to employ a design that provides a very broad response curve. However, such an approach may be unsuitable for use in a seismic-while-drilling (SWD) application, where the sensor must endure high-intensity shocks and vibrations from the drilling environment. A geophone having a broad response curve may be expected to have frequent high-energy collisions between the spring mounted mass and the sensor housing, with a correspondingly fast degradation in sensor performance, or conversely, may be expected to be so heavily damped that it is unsuitable for use as a seismic sensor. The nature of SWD application requires the geophone to be used in varying depth in the borehole. This results in a trade-off in selecting sensors of suitable resonance frequency. In deeper well, lower frequency seismic waves experiences lower attenuation while in shallower well, high frequency waves provides higher resolution.

BRIEF DESCRIPTION OF THE DRAWINGS

Accordingly, there are disclosed herein geophone designs, systems, and methods having tunable resonance frequencies and controllable damping. In the drawings.

Figure 1:
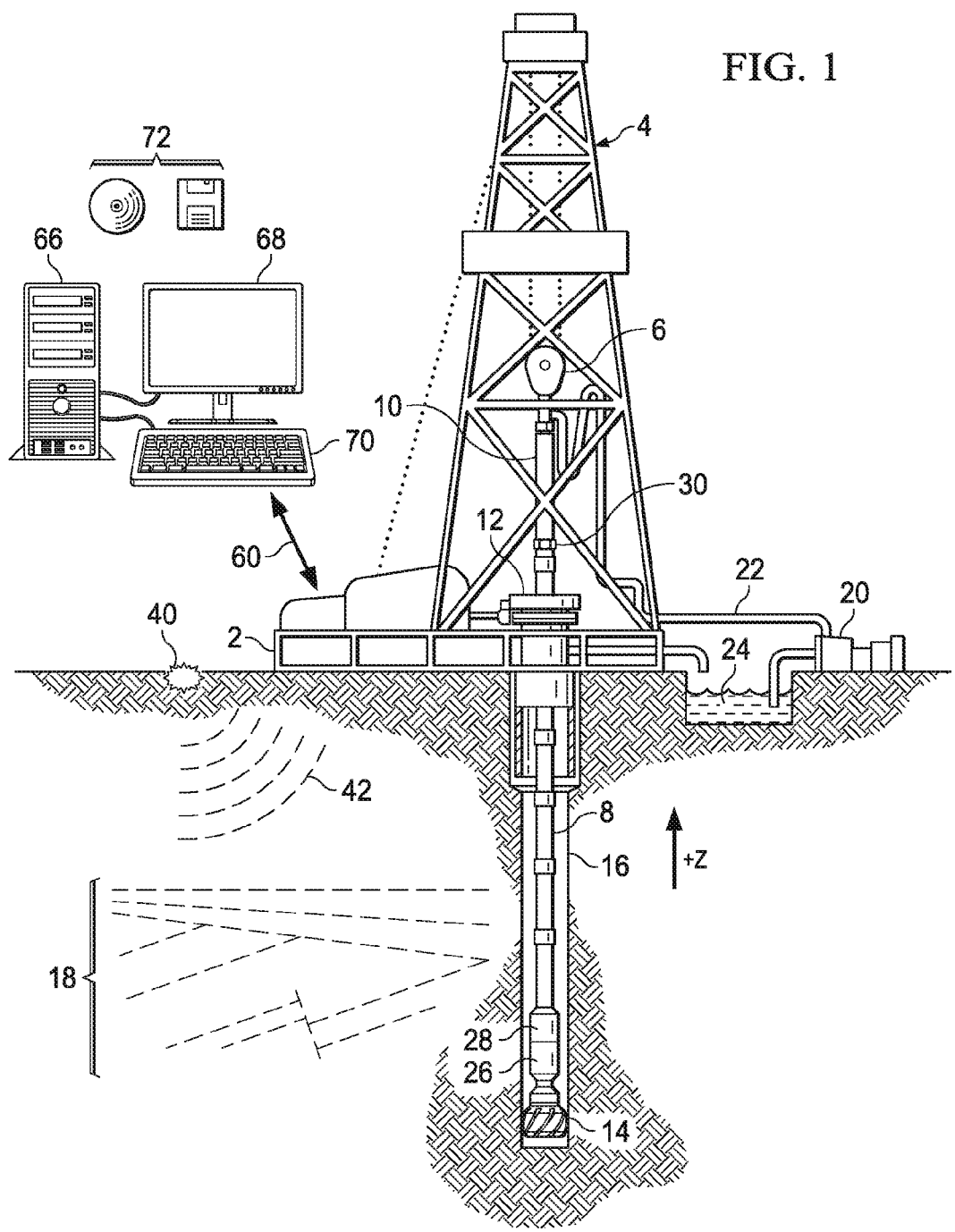
FIG. 1 shows an illustrative seismic-while-drilling (SWD) environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are various resonance frequency tuning techniques that may further provide controllable damping that facilitates the use of geophones in a seismic-while-drilling (SWD) environment. In at least some embodiments, the disclosed geophone architecture includes two or more inductive assemblies, each inductive assembly having a magnet in a spring-mass arrangement within an inductive coil, wherein the magnet and the inductive coil move relative to each other.

The magnet for each inductive assembly is coupled to the magnet of at least one other inductive assembly by a rigid or resilient coupling element. In at least some implementations, the resilient coupling element is a spring. This coupling element enables a given inductive assembly to control the resonance frequency of the adjacent inductive assembly or assemblies by configuring the inductive coil of the given inductive assembly to damp movement. Such damping may be achieved, for example, by short-circuiting the coil surrounding or by controlling the current in the coil to oppose the motion of the magnet. During operation in a sensing mode, the remaining inductive assembly can provide geophone sensor outputs in the normal fashion. However, at least some disclosed embodiments are further able to operate in a transport mode in which all inductive assemblies are damped to suppress motion of the masses relative to the housing, thus protecting the geophone from damage while being deployed into or retrieved from the borehole.

FIG. 1 shows an illustrative SWD environment having a drilling platform 2 equipped with a derrick 4 that supports a hoist 6 for raising and lowering a drill string 8 via a kelly 10. The hoist 6 lowers the drill string 8 through a rotary table 12 that engages the kelly 10 to rotate the drill string and thereby drive the drilling process. Connected to the lower end of the drill string 8 is a drill bit 14 that turns as the drill string rotates, extending a borehole 16 through various formations 18. A pump 20 circulates drilling fluid through a supply pipe 22, via a swivel to kelly 10, down through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 16.

A logging tool suite 26 is integrated into the bottom-hole assembly near the bit 14. As the bit 14 extends the borehole through the formations 18, logging tool 26 collects measurements relating to various formation 18 properties as well as the tool position and orientation and various other drilling conditions. During pauses in the drilling process (e.g., when the drill string 8 is extended by the addition of an additional length of tubing), the tool suite 26 collects seismic measurements with one or more geophones.

At predetermined or measurable time intervals during the pauses in drilling activity, a seismic source 40 (e.g., a surface vibrator or an explosive discharge) is triggered to create a "shot", i.e., a burst of seismic energy that propagates as seismic S-waves and/or P-waves 42 into the subsurface. Such waves undergo partial transmission, reflection, refraction, and mode transformation at acoustic impedance changes such as those caused by bed boundaries, fluid interfaces, and faults. The tool suite 26 includes seismic sensors, such as the disclosed geophones, to detect the seismic wave energy reaching the bottomhole assembly.

Data may be recorded in downhole memory when each shot is fired on the surface. The tool suite 26 (and the other system components) has a high-accuracy clock to ensure that the recorded measurements' timing can be synchronized to the timing of the shot. One possible synchronization approach is to synchronize the bottomhole assembly clock to a global standard, such as the Global Positioning System (GPS), prior to insertion into the borehole.

In some embodiments, a mud pulse telemetry sub 28 may be included in the drill string to transfer measurement data to a surface receiver 30 and to receive commands from the surface. The telemetry sub 28 operates by modulating the flow of drilling fluid to create pressure pulses that propagate along the fluid column between the bottom-hole assembly and the surface. (Mud pulse telemetry generally requires a flow of drilling fluid and thus is not performed while the pump is off.) Other downhole telemetry systems are known and may be employed.

The mud pulse telemetry receiver(s) 30 are coupled to a data acquisition system that digitizes the received signal and communicates it to a surface computer system 66 via a wired or wireless link 60. The link 60 can also support the transmission of commands and configuration information from the computer system 66 to the bottomhole assembly. Surface computer system 66 is configured by software (shown in FIG. 1 in the form of removable non-transient information storage media 72) to monitor and control downhole instruments 26, 28. System 66 includes a display device 68 and a user-input device 70 to enable a human operator to interact with the system control software 72.

Figure 2:
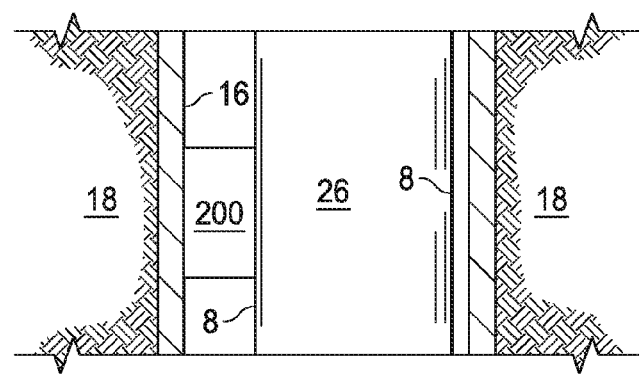
FIG. 2 shows an illustrative geophone deployment in a downhole environment.

FIG. 2 depicts an enlarged view of the logging tool suite 26 in a downhole portion of the SWD environment of FIG. 1. As previously noted, the drilling process may pause at times to collect seismic information. During such an occurrence, the logging tool suite 26 establishes an acoustic coupling to the wall of borehole 16. In FIG. 2, the acoustic coupling is established by radially extending an arm outward from the drill string 8 to place the sensor(s), such as a geophone 200, in mechanical contact with the borehole wall. To minimize acoustic conduction along the arm from the drill string 8 to the sensor(s), the coupling between the arm and drill string may be damped e.g., with hydraulics. Geophone 200 may be a single-axis geophone with an axis perpendicular to the borehole wall. Other orientations are possible, and in practice two-axis or three-axis geophone assemblies may be employed to enable sensing in multiple orthogonal directions.

The geophone need not be mounted on the arm, but may instead be integrated into the portion of the drillstring that is pressed against the opposite wall. While direct mechanical coupling between the geophone and borehole wall may be preferred, indirect couplings can alternatively be employed. As one example, the drillstring may be allowed to rest on the bottom of the borehole to provide the geophone with acoustic coupling via the drill bit.

FIG. 2 depicts a tool configuration suitable for use in a vertical borehole. In deviated or horizontal boreholes, the tool suite 26 may be expected to be resting against the bottom wall of the borehole during pauses in the drilling process, providing adequate coupling via the sheer weight of the tool. Thus tool configurations for use in such boreholes may omit arms or other relatively movable part that may be susceptible to damage. Moreover, at least some contemplated SWD system embodiments employ an array of many geophones along the length of the drill string.

Figure 3:
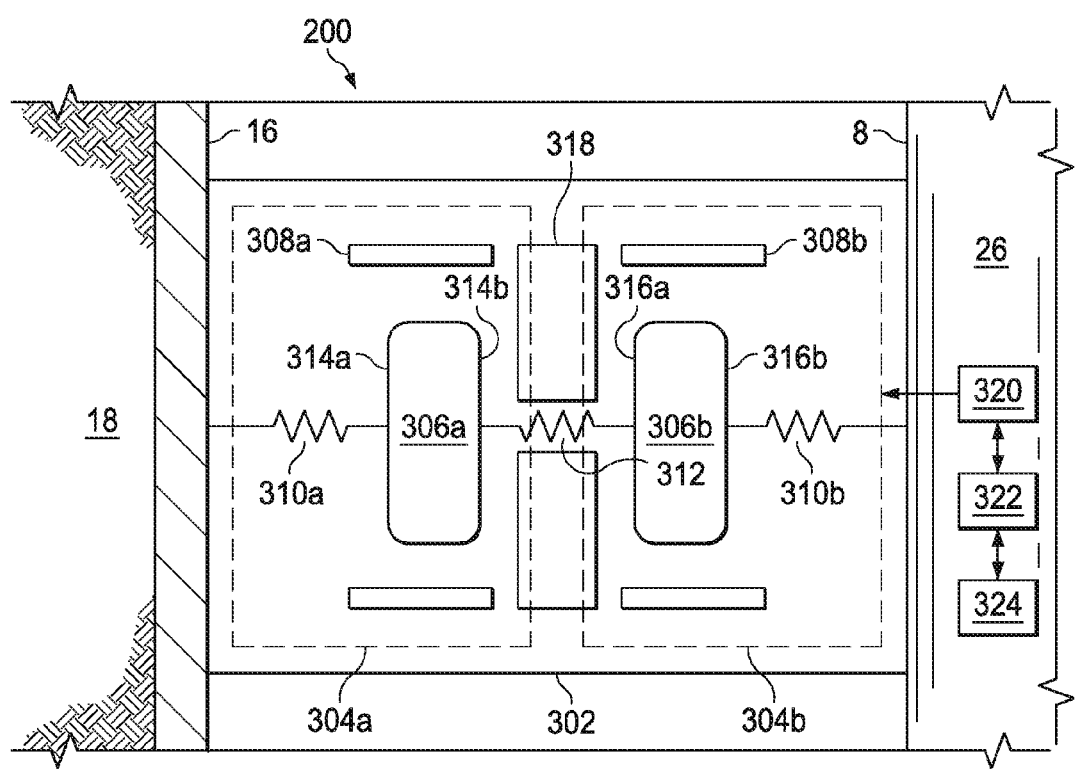
FIG. 3 shows an illustrative geophone.

FIG. 3 provides a schematic view of the geophone 200, according to one or more embodiments. As depicted, the geophone 200 includes a housing 302 with a first inductive assembly 304a and a second inductive assembly 304b arranged therein (shown in dashed). The inductive assemblies 304a,b are in a horizontally-spaced arrangement along the horizontal axis of the housing 302, one end of which is acoustically coupled directly or indirectly to a wall of the bore hole 16. As seismic energy 42 generated by the seismic source 40 (FIG. 1) displaces the housing 302 along its horizontal axis, the geophone 200 is able to detect it via operation of the inductive assemblies.

Each of the inductive assemblies 304a,b includes a respective magnet 306a,b arranged along the horizontal axis and within a respective inductive coil 308a,b, wherein the magnet 306a,b and the inductive coil 308a,b move relative to each other. The term "magnet" as used herein may include any mass or material that produces a magnetic field, such as ferromagnetic materials (e.g., iron, nickel, cobalt). Motion of the magnet's 306a,b magnetic field relative to the inductive coil 308a,b produces a signal proportional to the velocity of the magnetic field. It is expected that vertical motion relative to the housing would be suppressed by the geometry of the springs.

As depicted, each magnet 306a,b is coupled to one end of the geophone housing 302 with a respective spring 310a,b and the magnets 306a,b are coupled together by a coupling element 312. More particularly, the magnet 306a and magnet 306b are horizontally spaced apart along the axis of housing 302, with the left side 314a of the magnet 306a coupled to left wall of the housing 302 (i.e., closest to the bore hole 16) via the spring 310a, the right side 314b of the magnet 306a coupled to the left side of the magnet 306b via the coupling element 312, and right side of magnet 306b coupled to the right wall of the housing 302 (i.e., closest to the drill string 8) via the spring 310b. The springs 310a,b may be, for example and without limitation, a leaf spring, a coil spring, a cantilever spring, or the like. It will be appreciated by those of skill in the art that alternative embodiments contemplated herein may include where the magnet 306a,b of each inductive assembly 304a,b is stationary and the associated inductive coil 308a,b is movably coupled to the housing 302, possibly by springs similar to those discussed above.

Each inductive assembly 304a,b may be independently controlled and switchable between a "sensing mode" and a "damping mode". In the sensing mode, the inductive assembly 304a,b is able to measure relative motion between its corresponding magnet 306a,b and inductive coil 308a,b. In the damping mode the inductive assembly 304a,b at least partially inhibits relative motion between the magnet 306a,b and the coil 308a,b. In one illustrative damping mode, the inductive coil 308a,b is shorted, enabling motion of the magnet 306a,b to induce a current that, in turn, generates a field to oppose the motion of the magnet.

Alternatively, the damping mode may involve externally-applied current to inhibit motion of the magnet 306a,b. Such current may be provided through the use of a feedback path that enables support circuitry to determine and apply enough current to inhibit the magnet's motion. When the geophone 200 is not being employed to detect seismic energy (i.e., not in "sensing mode"), both inductive assemblies 304a,b may be placed in damping mode. Elsewhere herein, this state may be referred to as "transport mode" or "drilling mode".

The architecture of geophone 200 may support various configurations. For example, one configuration includes setting the first inductive assembly 304a in sensing mode while the second inductive assembly 304b is in damping mode. Similarly, the first inductive assembly 304a may be configured in damping mode while the second inductive assembly 304b is configured in sensing mode. As the assemblies 304a,b are coupled via the coupling element 312, damping one inductive assembly 304a,b effectively increases the spring stiffness and alters the resonant frequency of the sensing inductive assembly 304a,b.

The mass-spring configuration of each inductive assembly 304a,b creates a resonance frequency of $$\omega = \sqrt{\left(\frac{K}{M}\right)},$$

where $\omega$ is the resonant frequency of the geophone, K is the spring stiffness, and M represents the magnet mass. The coupling of the masses in the foregoing architecture enables the use of one inductive assembly 304a,b to alter the resonant frequency ($\omega$) of the sensing inductive assembly 304a,b to achieve higher signal-to-noise (SNR) measurements. Inhibiting the movement of the magnet 306a,b in one inductive assembly 304a,b can be understood to affect the spring stiffness (K) of the sensing inductive assembly 304a,b and thereby alters the resonant frequency of the geophone 200.

In some embodiments, the geophone 200 may further include a magnetic shield 318. As depicted, the magnetic shield 318 is arranged between the first and second inductive assemblies 304a,b, but does not interfere with the coupling element 312. The magnetic shield 318 prevents or reduces electromagnetic interaction between the inductive assemblies 304a,b.

The geophone connects to other components of the logging tool suite 26 (e.g., for control thereof and for storage of measurements). For example, the inductive assemblies 304a,b may electrically couple to a damping control unit 320, a controller 322, and a storage unit 322. The damping control unit 320, controller 322, and storage unit 322 may be arranged downhole, such as within the logging tool suite 26, arranged uphole, for example, with or within the surface computer system 66, or arranged in a combination thereof.

As depicted, the damping control unit 320 is communicably coupled to both of the inductive assemblies 304a,b and the controller 322. The damping control unit 320 may receive control signals from the controller 322 and, in response, act as the current source for one or both of the inductive assemblies 304a,b when in damping mode.

The controller 322 may be further communicatively coupled to a storage unit 324 to store acquired geophone measurements. In some embodiments, the controller 322 includes and/or executes a program or control loop to vary the level of damping for one of the inductive assemblies 304a,b to achieve a desired resonant frequency of the geophone 200. For example, assuming the first inductive assembly 304a is configured in sensing mode and the second inductive assembly 304b is configured in damping mode, the controller 322 may receive measurement data from the first inductive assembly 304a and diagnose a low SNR. To improve the SNR, the controller 322 may iteratively increase or decrease the level of damping for the second inductive assembly 304b via a command signal sent to the damping control unit 320. This process may be repeated until an acceptable SNR is reached. Such adjustability may be achieved by varying the number of turns in the shorted inductive coil, or varying the impedance in a feedback path of a circuit that drives the inductive coil in damping mode.

The geophone 200 may further be capable of performing self-diagnostic tests (e.g., checking the geophone "health" or accuracy). For example, again assuming the second inductive assembly 304b is configured in damping mode and the first inductive assembly 304a is configured in sensing mode, the controller 322 may generate a control signal to the damping control unit 320, inducing current to the magnetic coil 308b of the second inductive assembly 304b, thereby causing the corresponding magnet 306b to oscillate or move. Resulting therefrom, the coupled magnet 306a of the first inductive assembly 304a also moves and generates a response signal. The response signal is measured by the controller 322 and compared against an expected or previously stored measurement value to determine if the geophone is properly operating, wherein obtaining expected measurement values from the geophone may indicate normal operating and obtaining unexpected measurement value may indicate the geophone is damaged or requires calibration.

Figure 4:
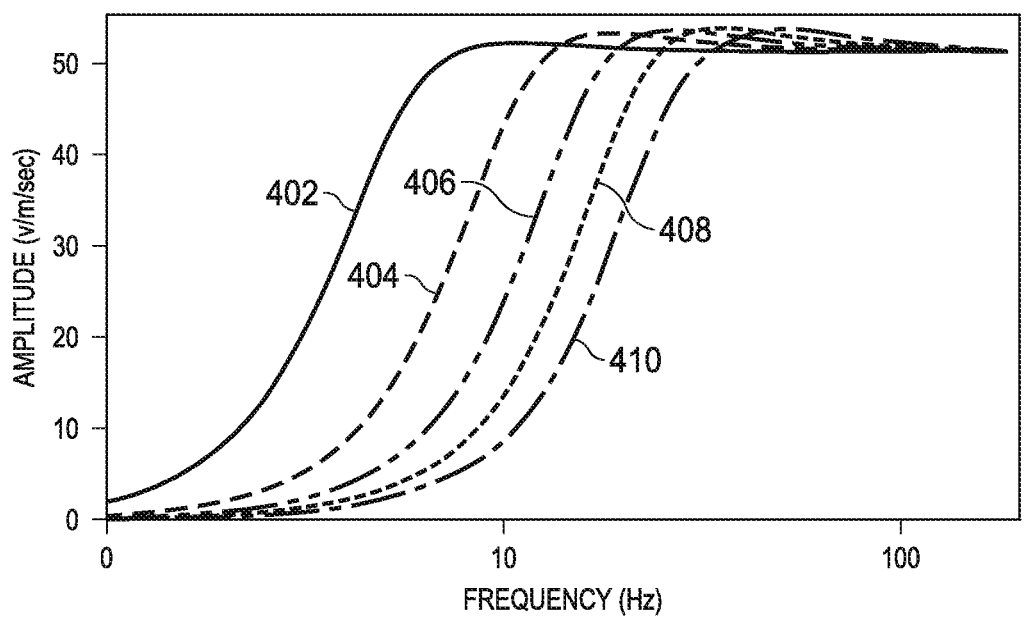
FIG. 4 shows illustrative frequency response curves for a tunable resonance frequency geophone.

FIG. 4 depicts a graph 400 exhibiting shifts of a frequency response curve of the geophone 200 (FIG. 3) when varying the first and second inductive assemblies 304a,b between sensing and damped modes. The graph 400 depicts five exemplary frequency response curves (a first response curve 402, a second response curve 404, a third response curve 406, a fourth response curve 408, and a fifth response curve 410) for the same geophone. The X-axis represents a logarithmic scale of the signal frequency in Hz and the Y-axis represents the measured signal amplitude in Volts/Meters/Sec (V/m/s).

The first response curve 402 illustrates the default frequency response of the geophone 200 when both inductive assemblies 304a,b are sensing. The second and third response curves 404 and 406, respectively, illustrate the frequency response when the first inductive assembly 304a is sensing and the second inductive assembly 304b is damped. More specifically, the second response curve 404 represents the second inductive assembly 304b being damped by way of shorting the corresponding inductive coil 308b. However, the third response curve 406 represents damping the second inductive assembly 304b by introducing current, for example, from the control unit 320 (FIG. 3) to the inductive coil 308b, thereby inhibiting motion of the second magnet 306b. Resulting therefrom, movement of the first magnet 306a is also increasingly suppressed (i.e., the spring constant K is increased) and the frequency response curve is shifted to the right, as depicted by the third response curve 406.

The fourth response curve 408 may result if operation of the inductive assemblies 304a,b is reversed, wherein the first inductive assembly 304a is damped via the associated inductive coil 308a and the second inductive assembly 304b is sensing. Notably, damping the first inductive assembly produces a different response than damping the second inductive assembly due to, for example, the magnets 306a,b of the inductive assemblies 304a,b being of unequal weight (thus, the magnet mass (M) of the resonant frequency equation is different, resulting in different frequency shifts). The fifth frequency curve 410 may result from both inductive assemblies 304a and 304b being in damper mode as may be advantageous while drilling.

Figure 5:
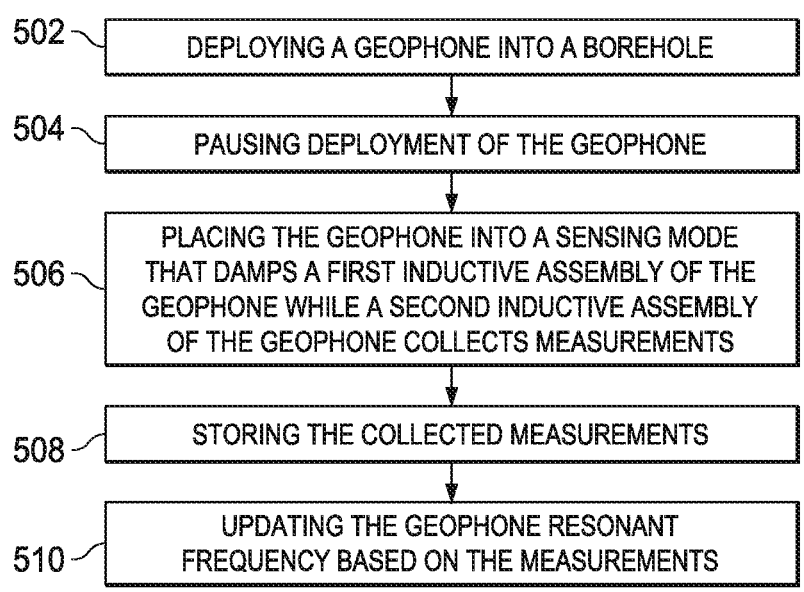
FIG. 5 shows a flowchart of an illustrative SWD method employing a tunable resonance frequency geophone.

Referring now to FIG. 5, illustrated is an exemplary flow chart 500 for a method of operating and controlling a geophone with tunable resonance frequency. The geophone may be similar to the geophone 200 of FIGS. 2 and 3, wherein the geophone includes two or more inductive assemblies, each inductive assembly including a magnet arranged within an inductive coil, and wherein each magnet is coupled to the magnet of at least one other inductive assembly. It should be understood that the method 500 may vary, for example, by including more or less steps or performing the steps in a different order.

As shown, the method 500 comprises deploying the geophone into a wellbore (block 502). Before or during deployment, the geophone may be configured such that all inductive assemblies are in a damped configuration to substantially preclude movement of the magnet and prevent damage to the sensor. Upon reaching a predetermined depth, deployment of the geophone is temporarily paused to acquire measurements, as at block 504.

At block 506, the geophone is placed into a sensing mode by damping a first inductive assembly while a second inductive assembly senses seismic signals or the earth's natural vibrations and collects measurements. In some embodiments, the damping level of the first inductive assembly may be controlled by a damping control unit arranged between and communicably coupled to the geophone and a controller. The damping control unit operates, for example, based on control signals received from a controller as described herein.

At block 508, the collected measurements may be stored, for example, by a storage unit as described herein. The stored measurements may be transmitted to the surface for further processing and/or may be analyzed to adjust the resonant frequency as described herein. For example, the controller may direct the damping control unit to update the level of damping based on a desired predetermined resonant frequency and/or signal-to-noise threshold. Accordingly, in some embodiments, the controller may generate an updated output signal based in whole or in part on the measured stored at block 504. The controller may incorporate real-time measurements or processed measured in determining a new damping level.

Additional geophone configurations will be appreciated by those of skill in the art. For example, the method 500 may include damping the second inductive assembly and sensing seismic vibrations with the first inductive assembly. The method 500 may also include damping both the first and second inductive assemblies, as may be advantageous before or after measurements are performed (i.e., when performing drilling) to prevent movement of the magnets and possible damage to the geophone. Moreover, the method 500 may also employ the self-diagnostic test described above, wherein one inductive assembly operates in a damping mode to move a corresponding magnet, thus also moving the magnet of the other inductive assembly coupled thereto. By measuring and comparing the response to expected or predicted data, obtaining expected measurements may indicate a properly working geophone and unexpected measurements may indicate the geophone is damaged or requires calibration.

To summarize, multiple coupled inductive assemblies are provided, with each of them operating in a damping mode during transport. In the sensing mode at least one assembly is configured for sensing with the other is optionally configured for damping. The level of damping may be adjustable to tune the geophone response to a desired range.

Numerous other modifications, equivalents, and alternatives, will become apparent to those skilled in the art once the above disclosure is fully appreciated. For example, the foregoing description focuses on SWD applications of the disclosed techniques, yet they may also apply to wireline services, in which the disclosed geophone and control thereof is part of a wireline logging sonde. Further, the teachings herein may also apply to monitoring well services, in which the disclosed geophone and control thereof is part of a production well, an injection well, or a monitoring well. In at least some embodiments, the source 40 (FIG. 1) need not be on the surface, and in some contemplated embodiments, it is included as part of a drill string, a wireline tool string, or a monitoring well environment. As an example, a downhole seismic subsystems may include a piezoelectric transducer such as those found in Halliburton's Acoustic Caliper and/or SONIC/BAT downhole tools. The triggering of the downhole source corresponds with the timing of recording intervals, e.g., in an event-driven fashion or at predetermined time intervals configured by the surface system prior to the downhole system entering into the borehole.

One variation of the disclosed geophone architecture employs three or more of the disclosed inductive assemblies, where adjacent magnets are coupled together as described herein. It is intended that the following claims be interpreted to embrace all such modifications, equivalents, and alternatives where applicable.

What is claimed is:

1. A geophone, comprising:
   a first inductive assembly including a first inductive coil having a first magnet arranged therein, wherein the first magnet and the first inductive coil move relative to each other;
   a second inductive assembly including a second inductive coil having a second magnet arranged therein, wherein the second magnet and the second inductive coil move relative to each other; and
   a coupling element coupling a movable element of the first inductive assembly with a moveable element of the second inductive assembly, wherein the first inductive assembly employs tunable damping to modify a resonant frequency of the second inductive assembly;
   wherein the coupling element is a spring.

2. The geophone of claim 1, further comprising:
   a housing for the first and second inductive assemblies, wherein the movable element of the first inductive assembly is the first magnet and the movable element of the second inductive assembly is the second magnet; and
   a spring for each magnet coupling the magnet to the housing.

3. The geophone of claim 1, further comprising:
   a housing for the first and second inductive assemblies, wherein the movable element of the first inductive assembly is the first inductive coil and the movable element of the second inductive assembly is the second inductive coil; and
   a spring for each inductive coil coupling the inductive coil to the housing.

4. The geophone of claim 1, wherein each of the magnets are coupled to a housing of the geophone by a spring.

5. The geophone of claim 1, further comprising a magnetic shield that reduces any magnetic coupling between the first and second inductive assemblies.

6. A seismic-while-drilling (SWD) system, comprising:
   a drill string having:
   a controller; and
   one or more geophones, each geophone including a movable element of a first inductive assembly coupled to a movable element of a second inductive assembly via a spring to adjust a resonant frequency of the second inductive assembly in accordance with a control signal from the controller.

7. The system of claim 6, wherein each geophone further comprises a damping control unit that shorts an inductive coil in the first inductive assembly in response to the control signal.

8. The system of claim 6, wherein each geophone further comprises a damping control unit that drives a current on an inductive coil in the first inductive assembly in response to said control signal.

9. The system of claim 6, wherein the controller receives seismic measurements from the second inductive assembly and responsively adapts a damping level of the first inductive assembly.

10. The system of claim 6, wherein the controller damps both inductive assemblies during drilling.

11. A method, comprising:
 deploying one or more geophones in a borehole, each geophone having first and second inductive assemblies with movable elements coupled together by a spring;
 pausing deployment of the one or more geophones;
 placing each geophone into a sensing mode in which the second inductive assembly measures seismic signals while having a resonant frequency that is affected at least in part by the first inductive assembly;
 storing the measured seismic signals; and
 adjusting each said resonant frequency.

12. The method of claim 11, further comprising communicating the collected measurements to a user.

13. The method of claim 11, further comprising generating a control signal for each geophone to control a level of damping for the first inductive assembly.

14. The method of claim 11, wherein said adjusting includes modifying a damping level of the first inductive assembly.

15. The method of claim 14, wherein said adjusting further includes analyzing the stored seismic signals to determine a suitable damping level.

16. The method of claim 14, wherein said adjusting further includes analyzing the measured seismic signals in real time to determine and adjust the damping level.

17. The method of claim 11, further comprising switching roles of the first and second inductive assemblies so that the first inductive assembly collects measurements while having a resonant frequency that is affected at least in part by damping the second inductive assembly.

18. The method of claim 11, further comprising: verifying operation of each geophone by driving the first inductive assembly to induce motion of the movable elements and measuring a response of the second inductive assembly.

19. The method of claim 11, further comprising: applying damping to both inductive assemblies of each geophone during transport.

\* \* \* \* \*